(12) United States Patent
Pancholy

(10) Patent No.: US 8,666,938 B1
(45) Date of Patent: Mar. 4, 2014

(54) INSTALLED APPLICATION CLONING AND FAILOVER TO VIRTUAL SERVER

(75) Inventor: Mitesh Pancholy, Daly City, CA (US)

(73) Assignee: VMware, Inc., Palo Alto, CA (US)

(*) Notice: Subject to any disclaimer, the term of this patent is extended or adjusted under 35 U.S.C. 154(b) by 0 days.

(21) Appl. No.: 13/433,124

(22) Filed: Mar. 28, 2012

(51) Int. Cl.
- *G06F 7/00* (2006.01)
- *G06F 17/00* (2006.01)
- *G06F 9/455* (2006.01)

(52) U.S. Cl.
CPC .............. *G06F 9/455* (2013.01); *G06F 9/4555* (2013.01); *G06F 2212/152* (2013.01)
USPC ............ 707/610; 707/758; 707/831; 717/174

(58) Field of Classification Search
CPC .. G06F 9/455; G06F 9/4555; G06F 2212/152
USPC ............................ 707/610, 758, 831; 717/174
See application file for complete search history.

(56) References Cited

U.S. PATENT DOCUMENTS

| | | | |
|---|---|---|---|
| 5,953,532 A * | 9/1999 | Lochbaum | 717/176 |
| 2002/0083430 A1* | 6/2002 | Kusuda et al. | 717/174 |
| 2003/0084010 A1* | 5/2003 | Bigus et al. | 706/6 |
| 2005/0257265 A1* | 11/2005 | Cook et al. | 726/23 |
| 2007/0283324 A1* | 12/2007 | Geisinger | 717/120 |
| 2008/0010630 A1 | 1/2008 | Ou-Yang | |
| 2009/0077664 A1* | 3/2009 | Hsu et al. | 726/24 |
| 2009/0271779 A1 | 10/2009 | Clark | |
| 2009/0313620 A1* | 12/2009 | Sedukhin et al. | 718/1 |
| 2010/0275252 A1* | 10/2010 | Yun | 726/7 |
| 2011/0010710 A1* | 1/2011 | Thrush et al. | 718/1 |

* cited by examiner

*Primary Examiner* — Phong Nguyen

(57) ABSTRACT

An application installed on a computer system is cloned to provide quick recovery and/or failover should the application become corrupted or inoperable. The installed application is profiled to determine a footprint of files, system registry, data files, and configurations (or "application resources") that are associated with the installed application. The installed application is then cloned as a virtualized application package that captures a plurality of application resources residing on the computer system. In an embodiment, the installed application is profiled by simulating a removal of the installed application from a virtual machine (VM) that is a copy of the computer system.

18 Claims, 5 Drawing Sheets

INSTALLED APPLICATION CLONING AND FAILOVER TO VIRTUAL SERVER

BACKGROUND

Application virtualization enables complex software to be delivered as self-contained executable files which can run instantly from any data source with zero installation, i.e., copying individual files and settings to the computer system. Application virtualization can provide many benefits, depending on the implementation. For example, using application virtualization, large applications such as Microsoft Office may be streamed from a shared network drive without any specialized client or server software. Further, using application virtualization, virtualized applications may be run in managed or unmanaged Microsoft Windows environments without requiring elevated security rights. This allows stronger security to be implemented by allowing applications that ordinarily require administrator rights to run on locked-down user accounts. A degree of isolation is imposed on virtualized applications, thereby protecting the local client computer against changes to the file system and registry for both custom developed and commercial applications, enabling true separation of application and operating system. In some cases, application virtualization may be used for disaster recovery to quickly redeploy and restore access to virtualized applications across a wide variety of client computers.

Some implementations of application virtualization, during the process of virtualization, create a single secure executable file (a "container" file) which encapsulates all registry changes and file system changes associated with a normal installation. Known approaches for application virtualization utilize an installer script or executable that contains executable code, data files, configurations, and other data for the application. Rather than execute the installer to perform an installation of the application on a computer system, some implementations of application virtualization utilize the installer to obtain executable code, data files, configurations, and other data for encapsulation in the container file.

However, in some information technology (IT) environments, an installer for an application may be unavailable. For example, applications in customized deployments, such as hardened applications, typically do not have a conventional installer that may be used to virtualize the application. Such applications (e.g., hardened applications) may not enjoy the many benefits provided by application virtualization, for example, failover or recovery mechanisms when the application becomes corrupted. As such, there is a demand for techniques for application virtualizations for applications for which installers are not available.

SUMMARY

One or more embodiments of the present invention provide techniques for providing application backup and failover, in particular, by creating a virtualized application to clone an installed application. In accordance with these techniques, the installed application is profiled to detect its footprint on a computer system, and a virtualized application package is created on a remote failover server that includes executable code, data files, registry settings, as well as user data and configurations, that define a current state of the application. Accordingly, if the original application ever fails, the application may be restored within a short period of time using the virtualized application package having the current state of the application stored therein. Embodiments of the invention further provide a mechanism to continually update the virtualized application package with changes made to the original application to maintain a copy of current state of the original application.

A method for backing up an application installed on a computer system, according to an embodiment, includes virtualizing the computer system to generate a virtualized computer system having a copy of the application installed thereon and uninstalling the copy of the application from the virtualized computer system. The method further includes comparing states of the virtualized computer system prior to the uninstalling and after the uninstalling to determine locations of application resources associated with the application. A virtualized application package is generated for the application based on the determined locations of the application resources associated with the application.

Further embodiments of the present invention include, without limitation, a non-transitory computer-readable storage medium that includes instructions that enable a processing unit to implement one or more aspects of the above method as well as a computer system configured to implement one or more aspects of the above method.

DETAILED DESCRIPTION

Figure 1:
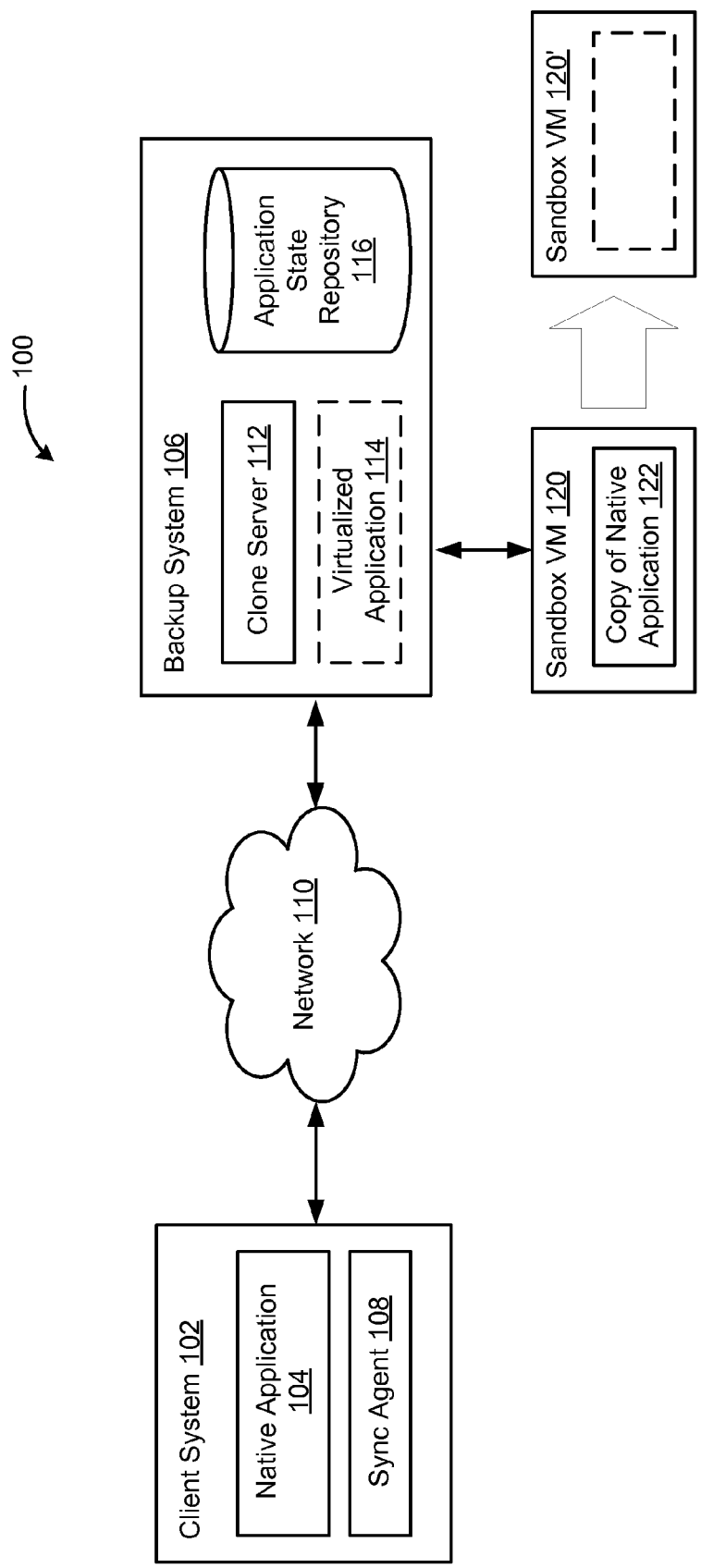
FIG. 1 is a block diagram that illustrates an exemplary computer system with which one or more embodiments of the present invention may be utilized.

FIG. 1 is a block diagram that illustrates an exemplary computer system 100 in which one or more embodiments of the present invention may be utilized. Computer system 100 includes a client system 102 having a native application 104 installed thereon and to be cloned for application failover. Client system 102 is communicatively coupled, via a network 110, to a backup system 106 configured to provide application backup and failover according to techniques described herein. Network 110 may be a local area network (LAN) connection, a wide area network (WAN), or other suitable communications network. Client system 102 may be any general purpose computer device that includes conventional components, such as a processor, memory, storage, and network interface. Alternatively, client system 102 may be a virtual machine (VM) sharing the hardware resources (e.g., processor, memory, storage, and/or networking resources) of a host computer (not shown). Similarly, backup system 106 may be any general purpose computer device that includes conventional components, such as a processor, memory, storage, and network interface, or alternatively, may be a VM sharing the hardware resources (e.g., processor, memory, storage, and/or networking resources) of a host computer (not shown).

Client system 102 includes a native application 104 installed thereon that may be targeted for application cloning according to techniques described herein. As used herein, the term "application" generally refers to computer software, including, for example, a stand-alone application, a run-time library or framework, and a plug-in or extension. In one embodiment, an application, such as native application 104, is associated with a plurality of files and system settings used when executing the application (collectively referred to as "application resources"). The application resources may include programs, scripts, executable code, data files, shared library classes, binary data, environmental variables, registry settings, configuration settings and files, and other application data. In some embodiments where the application resources include user data, configurations, registry settings, and other information, the application resources for an application represent a logical state of the application.

Client system 102 is configured to communicate with backup system 106 to facilitate application cloning for an application locally installed at client system 102 (e.g., native application 104) to backup system 106. Client system 102 is further configured to coordinate with backup system 106 to continually update cloned application (e.g., virtualized application 114) to correspond to native application 104 running in client system 102. In one embodiment, client system 102 further includes a sync agent 108, which is an application or process that monitors the operations of native application 104 and captures any changes performed on or by native application 104. The captured changes are continually provided to backup system 106 as native application 104 runs on client system 102. Sync agent 108 is further configured to monitor the status of running native application 104 and perform a failover operation should native application 104 become corrupted or otherwise fail, as described in detail in conjunction with FIG. 4.

Backup system 106 is configured to be operable by a system administrator or other suitable user to back up one or more applications (e.g., native application 104) locally installed on client system 102, including user data and configurations, to backup system 106. In one embodiment, backup system 106 includes a clone server 112 configured to communicate with client system 102 and clone a target application installed at client system 102 (e.g., native application 104) by generating a corresponding virtualized application 114.

Application virtualization is a generally known technique for decoupling an application from its underlying operating system to eliminate application conflicts and streamline application delivery and management. One example of a solution that provides application virtualization is ThinApp®, made available by VMware, Inc. of Palo Alto, Calif. A virtualized application may be generated by encapsulating application resources into a virtualized application package that can be deployed, managed, and updated independently from the underlying operating system (OS). The application package may include an executable software layer logically interposed between the OS and the application that provides a sandbox-type of environment (sometimes referred to as a "virtualized environment") isolated, or partially isolated, from the underlying OS or other applications. As such, the virtualized applications do not make any changes to the underlying OS and continue to behave the same across different configurations for compatibility, consistent end-user experiences, and ease of management.

Clone server 112 is configured to generate a virtualized application package that is a virtual copy of native application 104 and contains a plurality of application resources (e.g., executable code, data files, configurations, registry settings) for native application 104. However, as described above, in cases where a corresponding installer for a native application is unavailable, generating a virtualized application based on the native application may be difficult. Without a corresponding installer, it may be challenging to identify which application resources should be included in the virtualized application. As such, according to embodiments of the invention, clone server 112 is configured to determine the application resources to be included in virtualized application 114 by simulating removal of native application 104 from client system 102.

In some embodiments, clone server 112 is configured to create one or more temporary virtual machines (VMs), referred to herein as a sandbox VM 120, to facilitate cloning of native application 104. Sandbox VM 120 is a virtualized copy of the client system 102 and includes all operating system files, application files, and other data of client system 102, including a copy 122 of native application 104 and any associated application resources. Clone server 112 uses sandbox VM 120 to identify the application resources to be included in virtualized application 114 by removing, or uninstalling, copy 122 of native application 104 from sandbox VM 120 (as depicted by an altered state of sandbox VM 120'). The operations of clone server 112 with respect to sandbox VM 120 are described in greater detail below in conjunction with FIG. 3.

After creation of virtualized application 114, clone server 112 of backup system 106 continues to update virtualized application 114 during use of the original application from which virtualized application 114 is cloned (e.g., native application 104). In one embodiment, backup system 106 is configured to receive, from sync agent 108 executing on client system 102, a plurality of application changes for virtualized application 114 that represent a modified state of native application 104. The plurality of application changes enable virtualized application 114 to be synchronized with the original application (e.g., native application 104), while the original application continues to run in client system 102. The plurality of application changes may be embodied as changes to one or more application resources of virtualized application 114, for example, such as a modified registry value or additional data file.

As further illustrated in FIG. 1, backup system 106 includes a central repository, referred as an application state repository 116, which stores the plurality of application changes for virtualized application 114. As each application change represents a different state of virtualized application 114, backup system 106 may provide access to the plurality of application changes as a library of versioned application states for virtualized application 114. A user (e.g., system administrator) may select a particular application state from a particular point in the lifetime of the original application. For example, if an application has been corrupted, a system administrator may select an application state for the backup application just prior to the moment of corruption.

Figure 2:
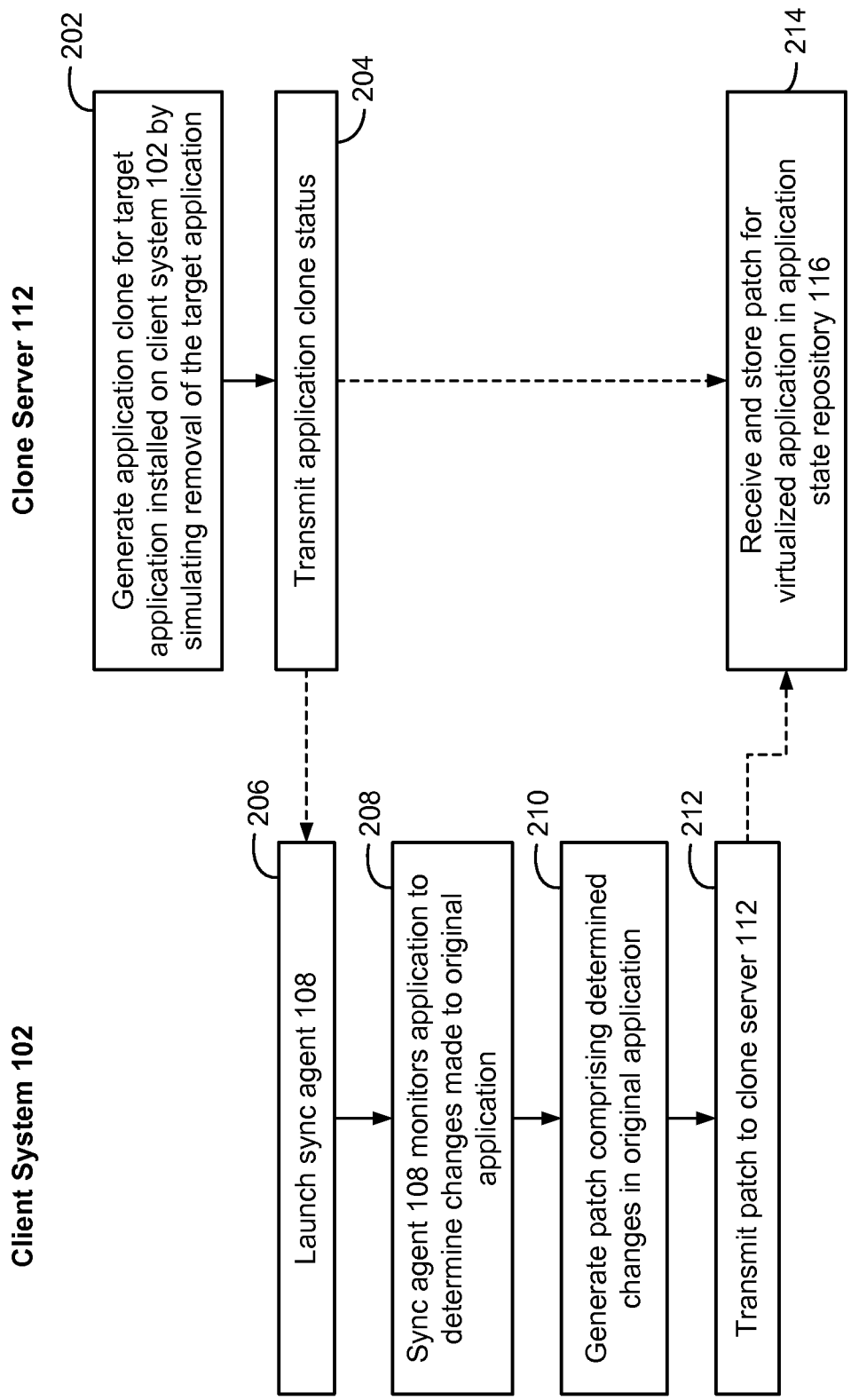
FIG. 2 is a flow diagram that illustrates steps for a method for backing up an application according to an embodiment of the present invention.

FIG. 2 is a flow diagram that illustrates steps for backing up an application installed on a computer system by creating a virtualized application 114, according to one embodiment of the present invention. It should be recognized that, even though the method is described in conjunction with the systems of FIG. 1, any system configured to perform the method steps is within the scope of embodiments of the invention.

At step 202, in response to user input, clone server 112 generates an application clone for a target application (e.g., native application 104) installed and executing on client system 102. Clone server 112 profiles native application 104 to determine which application resources of native application 104 should be captured to generate a virtualized application package. While embodiments of the present disclosure describe a technique for profiling native application 104 by simulating removal of native application 104, it should be recognized that native application 104 may be profiled using a variety of other approaches to determine the application resources (e.g., files, registry keys, resource files, licenses) and corresponding metadata (e.g., file permissions) for each to produce a virtualized copy of native application 104.

Figure 3:
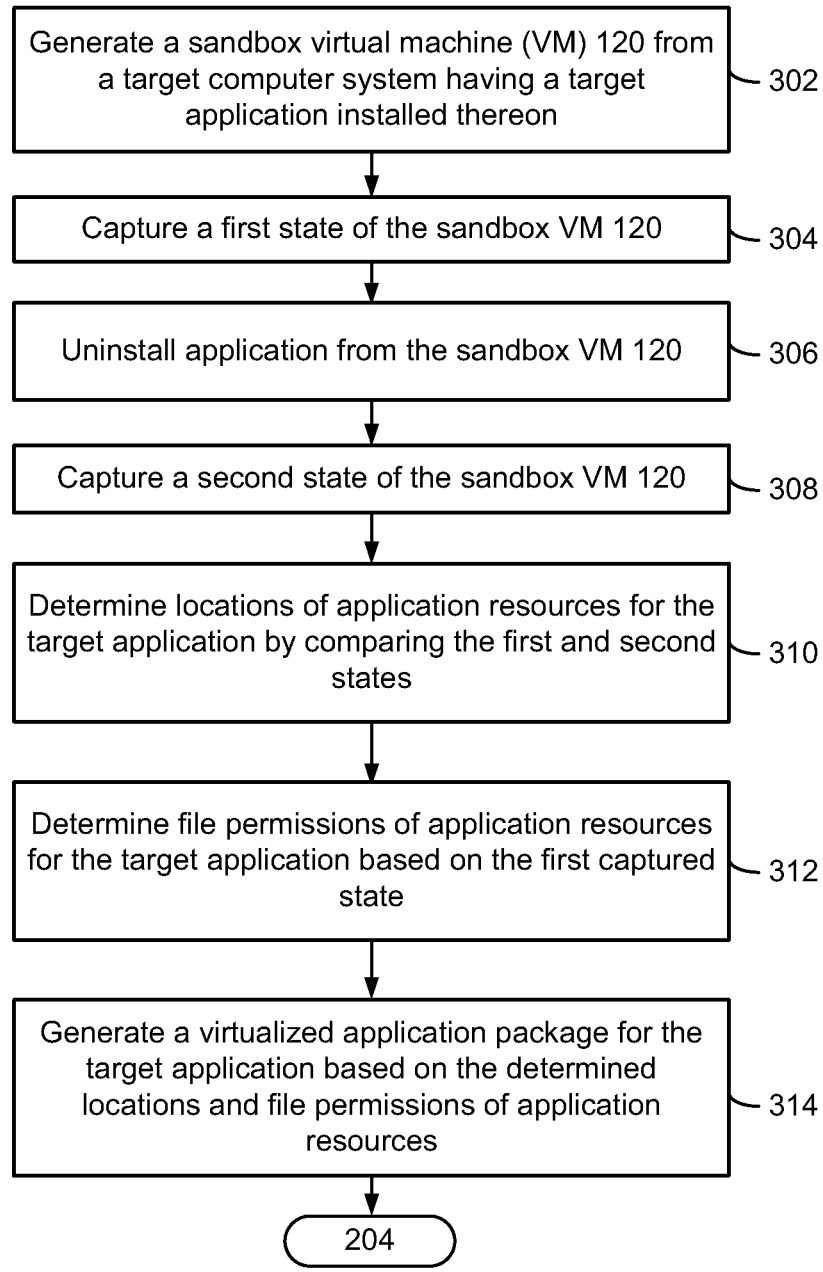
FIG. 3 is a flow diagram that illustrates steps for a method for backing up an application according to an embodiment of the present invention.

FIG. 3 illustrate an exemplary operation for cloning a target application (e.g., native application 104) installed on a target computer system (e.g., client system 102). In step 302, client system 102 having native application 104 installed thereon is copied to create a corresponding sandbox VM (e.g., sandbox VM 120) that contains all operating system files, application files, and other data (including native application 104 and any associated application resources) of client system 102. In one example, in cases where client system 102 is a physical computing device (e.g., server), a physical-to-virtual ("P2V") transform procedure may be performed by copying images of physical hard disks of client system 102 to virtual hard disks of sandbox VM 120. It should be recognized that sandbox VM 120 is used to perform profiling operations described herein and may be discarded or de-allocated after the application backup procedure has been completed.

In step 304, a first snapshot recording the state of the file system and registry, sometimes referred to as a "pre-scan," is captured to observe the current state of sandbox VM 120 and any application resources (e.g., file system, registry, etc.) that may make up sandbox copy 122 of the target application.

In step 306, sandbox copy 122 of the target application is uninstalled from sandbox VM 120. It should be recognized that the application resources for an application installed on a system may be distributed in locations throughout the file system and registry of the system (e.g., in system and user directories, in various hierarchies of system registry). As such, each application includes an uninstall mechanism that removes the application and its associated application resources (e.g., executables, data files, system registry entries, directories, and other files) from client system 102. For example, the uninstall mechanism may be an uninstall script configured to, when executed by sandbox VM 120, remove the application resources for the application from pre-determined locations within sandbox VM 120. In another example, the uninstall mechanism may be an operating system level feature (e.g., "add/remove programs") that provides an uninstall procedure for any applications registered with the operating system of sandbox VM 120. In an embodiment, after sandbox copy 122 of the target application is uninstalled, one or more application resources associated with the target application may be deleted, reverted, and/or modified in sandbox VM 120, post-uninstallation.

In step 308, a second snapshot, sometimes referred to as a post-scan, is taken of sandbox VM 120 to observe the post-uninstall state of sandbox VM 120. In step 310, one or more locations (e.g., within the file system, within registry) of application resources for the target application are determined by comparing the first and second snapshots. The differences between the first and second snapshots provides locations of application resources that were removed, deleted, and/or modified due to the uninstall procedure performed in step 306. By determining which application resources were removed by the uninstall procedure, embodiments of the invention are able to distinguish the application resources that make up the target application from the other resources, files, registry keys, and data residing on sandbox VM 120. In one particular implementation, the differences between the first and second snapshots, referred to as deltas, related to the file system and registry of sandbox VM 120 may be captured in a working project directory.

In an embodiment, in step 312, sandbox VM 120 is restored to its original state by reverting back to the first snapshot, as captured in step 304. Since some metadata may have been discarded during the snapshot-comparison operation in step 310, file permissions and other metadata for the application resources identified in step 310 are observed and noted. In the implementation described above, the observed file permissions are applied to the application resources contained in the working project directory to maintain the original file permissions of application resources of native application 104.

In step 314, a virtualized application package for the target application is generated based on the locations and file permissions of the application resources determined in steps 310 and 312. The virtualized application package contains all application resources, including files, registry keys, data files, source files, user data, session data, configurations, etc., that represent a currents state of native application 104 running on client system 102. Virtualized application package may be centrally stored at backup system 106 and executed by backup system 106 upon failure of original target application 104, or alternatively, may be streamed to and executed by client system 102.

Figure 5:
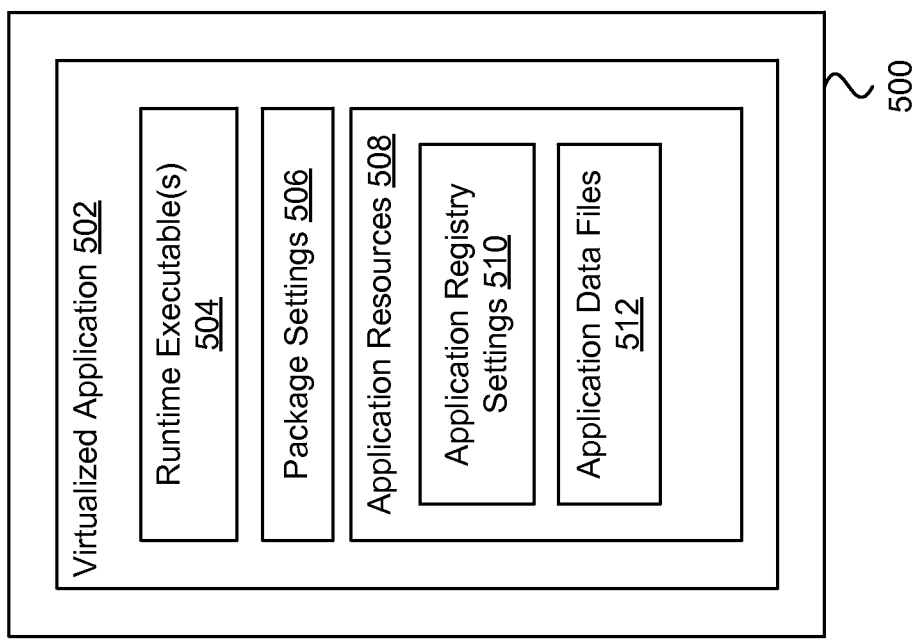
FIG. 5 depicts one embodiment of a virtualized application package as generated by the method of FIG. 2.

FIG. 5 depicts one embodiment of a virtualized application package 500 generated by the method of FIG. 3. While, in this embodiment, all of these components are packaged into a single container file, it should be recognized that other packaging arrangements are contemplated, such as, for example, separate files for each of the listed components.

Virtualized application package 500 is configured to provide a virtualized execution environment isolated from an underlying operating system and configured to execute a virtualized application 502 contained therein. In one embodiment, virtualized application package 500 includes one or more runtime executables 504 that implement a virtualization layer between the application and underlying operating system, package settings 506, and a plurality of application resources 508 for executing the application contained therein. Package settings 506 allow a system administrator to alter the behavior and/or impose restrictions on the use of the virtualized application package. In one implementation, package settings 506 are contained in a package configuration file having an "INI" format (e.g., package.ini). In some embodiments, runtime executable 504 is configure, upon launching, to query a remote server (e.g., backup system 106) for any updates to virtualized application 114, as specified by package settings 506, as will be described in further detail below.

In the embodiment described herein, the application resources include application registry settings 510 and application data files 512. The virtualization layer redirects read and write operations to and from the plurality of application resources using a mapping between locations of application resources 508 and locations of the application resources within the virtualized execution environment.

Optionally, additional procedures may be performed to further refine a profile of the target application and include additional application resources within the generated virtualized application package. In an embodiment, sandbox copy 122 of the target application may be observed during application startup and runtime (in addition to uninstall) to generate an additional list of application resources (e.g., files and registry keys) that are impacted by the target application. For example, a utility may be used to identify process threads associated with the target application and monitor for any library files (e.g., dynamic-link libraries, or DLLs) or other application resources that are accessed or modified by the process threads.

Returning to FIG. 2, after generating a virtualized application package (e.g., virtualized application 114) that is a clone of the target application (e.g., native application 104), in step 204, clone server 112 transmits a status message to client system 102 indicating that native application 104 has been successfully cloned. In step 206, responsive to receiving an indication of application cloning, client system 102 launches sync agent 108 to synchronize native application 104 with a library (e.g., application state repository 116) that persists the application state of virtualized application 114.

In step 208, sync agent 108 executing on client system 102 monitors native application 104 (and execution thereof) to detect any changes made to native application 104. In some embodiments, sync agent 108 may poll periodically to check for application resources changed by native application 104. In other embodiments, sync agent 108 may actively monitor process threads associated with running native application 104 to observe any application resources that are accessed or modified by the processed threads of native application 104.

In step 210, sync agent 108 generates one or more application patches for virtualized application 114 that comprise the captured changes to one or more application resources in native application 104. In some embodiments, application patches may include new application resources for native application 104, updated versions of existing application resources, and indications to remove obsolete application resources. For example, an application patch may include a new version of a library file (e.g., win32.dll). In another example, an application patch may include a change to an existing registry key value (e.g., HKEY_LOCAL_MACHINE\SOFTWARE\Microsoft\Windows\SettingExample).

In some embodiments, rather than include an entire application resource, sync agent 108 may generate data differentials that captures changes to the application resources of native application 104. A variety of tools and mechanisms may be utilized to determine data differentials and advantageously reduce the amount of data to be transmitted and stored between client system 102 and backup system 106. One tool for managing file differences and updates is provided by Rsync, an open-source software package available for UNIX and related operating systems. Another tool for generating update files is described in detail in U.S. patent application Ser. No. 12/429,584, filed Apr. 24, 2009 and entitled "Updating a File Using Differences and File Format Therefor," the entire contents of which are incorporated by reference herein.

In step 212, sync agent running on client system 102 transmits the one or more application patches to clone server 112. In some embodiments, the application patches may include timestamp information that indicates the date and time in which the application patch was generated. The timestamp information may be utilized to a timeline of application states for native application 104 to facilitate application recovery at later time.

In step 214, clone server 112 receives and stores the one or more application patches for virtualized application 114 in application state repository 116. In some embodiments, clone server 112 stores the received application patches as application states of virtualized application 114, for example, identified by a unique version number and/or a timestamp for when the version was backed up. Clone server 112 may publish which application states are available from application state repository 116 as a catalog of application states from the lifecycle of corresponding native application 104 that may be restored.

Figure 4:
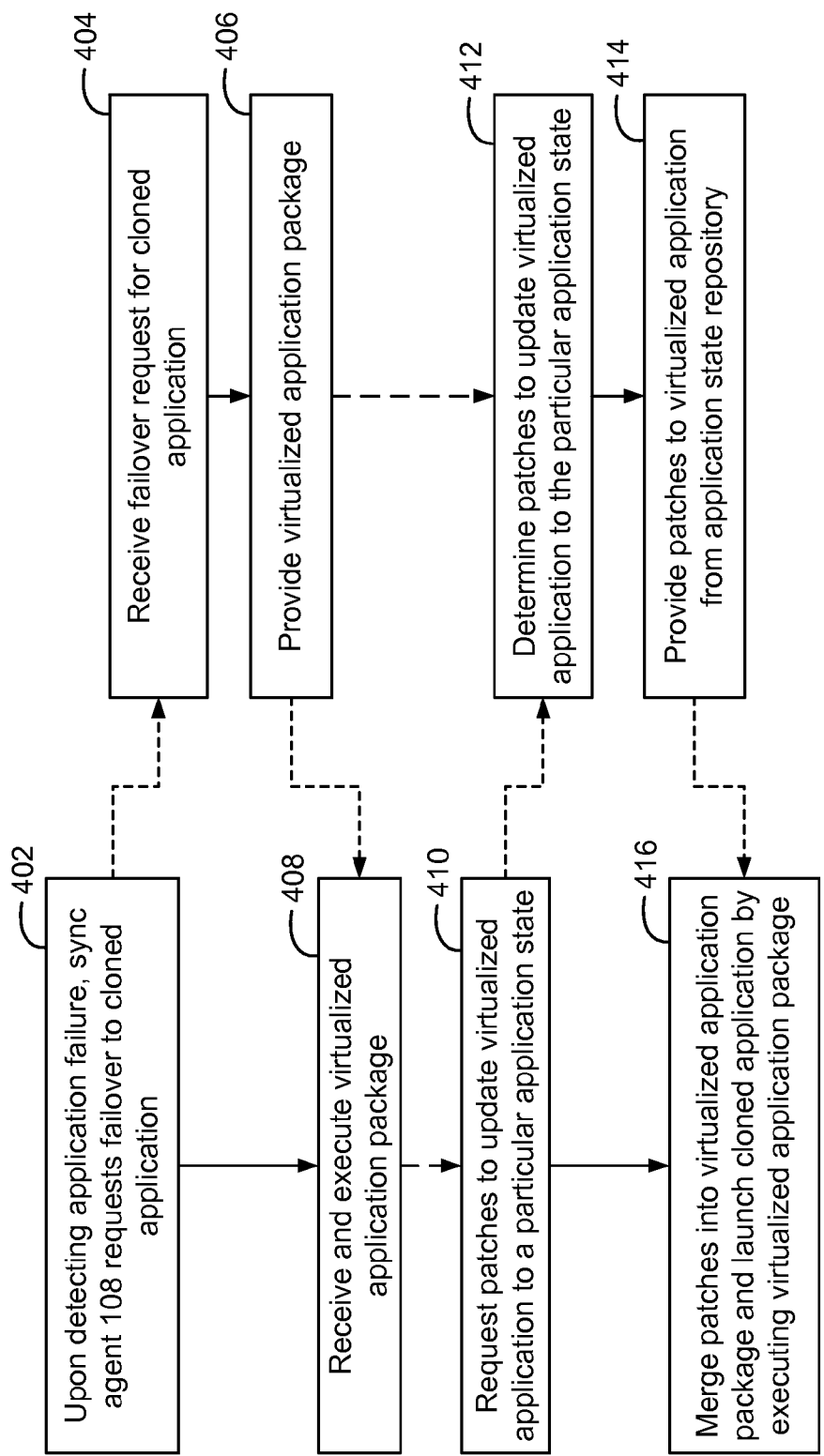
FIG. 4 is a flow diagram that illustrates steps for a method for failing over to an application clone according to an embodiment of the present invention.

FIG. 4 is a flow diagram that illustrates steps for failing over to a virtualized application 114, according to one embodiment of the present invention. It should be recognized that, even though the method is described in conjunction with the systems of FIG. 1, any system configured to perform the method steps is within the scope of embodiments of the invention.

As described above, sync agent 108 may be configured to monitor the status of native application 104 running in client system 102. In some embodiments, sync agent 108 utilizes a monitoring tool, such as monit, an open-source software package available for UNIX and related operating systems, for supervising processes running on a computer system. In step 402, sync agent 108 transmits, to backup system 106, a request to failover to virtualized application 114. The failover request may be transmitted automatically responsive to detecting failure of native application 104, or alternatively, may transmitted responsive to user input. In step 404, backup system 106 receives, from sync agent 108, the request to failover to virtualized application 114.

In step 406, responsive to receiving the failover request, backup system 106 provides a virtualized application package comprising application resources for virtualized application 114 (e.g., one example of which is depicted in FIG. 5). In some embodiments, the virtualized application package may be streamed to client system 102, for example, using data block streaming over network 110. In an alternative embodiment, rather than provide the virtualized application package to client system 102, backup system 106 may execute the virtualized application package to launch virtualized application 114 and subsequent requests for client system 102 may instead be routed to backup system 106.

In step 408, sync agent 108 running on client system 102 receives and executes the virtualized application package to launch virtualized application 114. The virtualized application package may be configured, upon execution, to determine whether any updates are available for virtualized application 114, and update virtualized application 114 accordingly. In some embodiments, sync agent 108 may be configured to update the received virtualized application to be synchronized with the last known application state of original native application 104 running on client system 102.

In some embodiments, an update mechanism embedded in the virtualized application package, sometimes referred to as "application sync" mechanism, queries a remote server (e.g., backup system 106) to see if an updated version, or other specified version, of the virtualized application package is available. In the embodiment shown in FIG. 4, in step 410, client system 102 requests one or more patches to update the virtualized application package to a particular application state. Client system 102 may determine a version number for virtualized application 114 that corresponds to the particular application state of native application 104 just prior to its failure, or any other application state of native application 104 last known to be functioning properly. In some embodiments, client system 102 may determine a version number for virtualized application 114 responsive to user input that indicates a selected application state (e.g., from a library of available application states).

In step 412, responsive to the update request from client system 102, backup system 106 determines or more patches to update the virtualized application to the particular application state indicated by the update request. For example, backup system 106 determines that to update the virtualized application to a requested version 201102412, patches should be made to an executable, several dynamic link libraries, and a registry setting. In step 414, backup system 106 provides the patches for the virtualized application to client system 102 from application state repository 116. In some embodiments, the patches are configured as differential data that may be applied to the existing virtualized application package at client system 102, for example, using the example techniques for updating application resources (e.g., files) described above.

In step 416, the virtualized application package executing on client system 102 receives and merges the patches into the virtualized application package to construct an updated version of the virtualized application package. The updated virtualized application package is then executed to launch virtualized application 114 having the requested application state (e.g., the state of native application 104 as it was running, before failure), thereby reducing recovery time and reducing any lost state (e.g., user data, configurations, or registry values).

Figure 6:
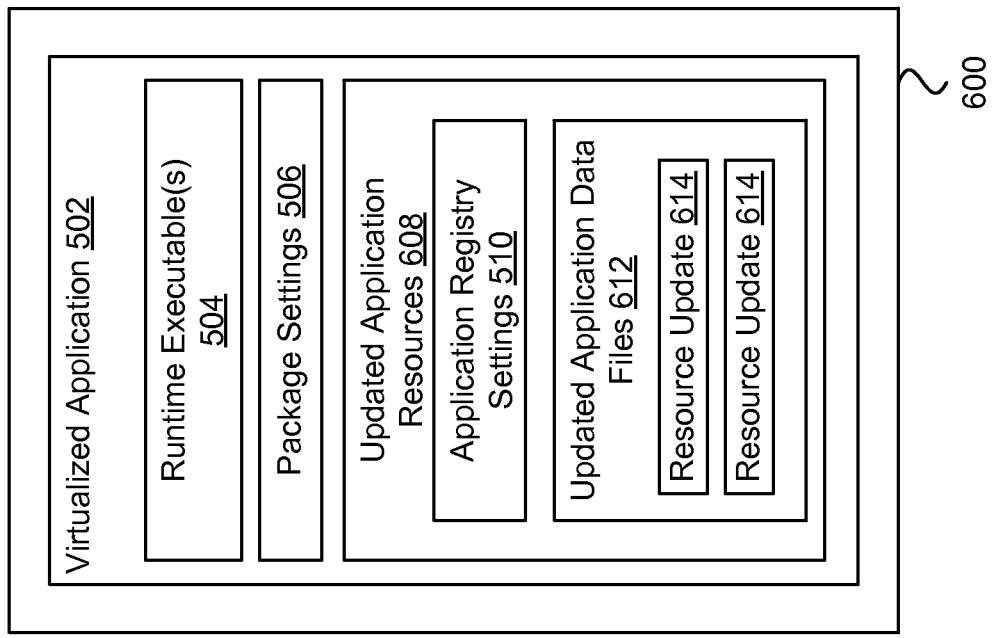
FIG. 6 depicts one embodiment of an updated virtualized application package.

FIG. 6 depicts one embodiment of an updated virtualized application package 600 created by the operations of FIG. 2. The updated virtualized application package 600 is configured similarly to virtualized application package 500 shown in FIG. 5, except that updated virtualized application package 600 includes updated application resources 618 that incorporate one or more changes to define a particular application state of virtualized application 502. As shown, updated application resources 618 of updated virtualized application package 600 include one or more resource updates 614 to update application data file 612 according to one or more file update techniques described above. Resource updates 614 provide user data configurations that supplement and/or override data defined by cloned virtualized application (e.g., virtualized application package 500) as originally cloned.

While embodiments of the invention have been described a particular update method in detail, it should be recognized that other suitable update methods may be utilized in accordance with certain aspects of the present disclosure. For example, in some embodiments, an incremental file update method (sometimes referred to as a "side-by-side" or "integer" update method) is utilized to update one or more application resources for virtualized application 114. In this approach, updated application resources are merged into the existing virtualized application package. The updated application resources are given an incremented identifier, such as an incremented file extension, and are placed alongside the previous version of the application resources. When the virtualized application package is executed, the most recent version of an application resource, as denoted by its file extension increment, is used for the virtualized application. For example, an updated executable file (e.g., "firefox.exe.1") may be added to a virtualized application package for Mozilla Firefox having an original version of the executable (e.g., "firefox.exe"). Subsequent updates to the executable file (e.g., "firefox.exe.2", "firefox.exe.3") would be further placed in the virtualized application package. When the package is executed, the updated executable file having the latest version (e.g., "firefox.exe.3") would be used in place of the original executable (e.g., "firefox.exe").

Further, in some alternative embodiments, backup system 106 may be configured to incorporate one or more updates to virtualized application prior to delivering the virtualized application package to client system 102. For example, the failover request transmitted in step 402 may include a version number that identifies a requested application state of virtualized application 114. In response, backup system 106 retrieves patches to virtualized application 114 and merges the patches into the virtualized application package prior to providing the virtualized application package in step 406.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for backing up an application installed on a computer system, comprising:
   virtualizing the computer system to generate a virtualized computer system having a copy of the application installed thereon;
   uninstalling the copy of the application from the virtualized computer system;
   determining locations of application resources associated with the application based on a comparison of states of the virtualized computer system prior to the uninstalling and after the uninstalling;
   generating a virtualized application package for the application based on the determined locations of the application resources associated with the application; and
   generating a library of application states for the application, wherein the library of application states comprises a plurality of versioned changes to at least one application resource of the virtualized application package.

2. The method of claim 1, further comprising:
   modifying the virtualized application package to synchronize application state of the application installed on the computer system.

3. The method of claim 1, further comprising:
   receiving one or more changes to at least one application resource of the virtualized application package.

4. The method of claim 1, further comprising:
   responsive to receiving a request to failover to the virtualized application package, determining an application state for the virtualized application package; and
   retrieving one or more versioned changes to at least one application resource of the virtualized application package to generate the determined application state.

5. The method of claim 1, further comprising:
   determining file permissions for the application resources associated with the application according to a state of the virtualized computer system prior to the uninstalling.

6. The method of claim 1, further comprising:
   monitoring execution of the copy of the application on the virtualized computer system to determine additional application resources associated with the application.

7. A non-transitory computer-readable storage medium comprising instructions that, when executed in a computing device, back up an application installed on a computer system, by performing the steps of:
   virtualizing the computer system to generate a virtualized computer system having a copy of the application installed thereon;
   uninstalling the copy of the application from the virtualized computer system;
   determining locations of application resources associated with the application based on a comparison of states of the virtualized computer system prior to the uninstalling and after the uninstalling;
   generating a virtualized application package for the application based on the determined locations of the application resources associated with the application; and
   generating a library of application states for the application, wherein the library of application states comprises a plurality of versioned changes to at least one application resource of the virtualized application package.

8. The non-transitory computer-readable storage medium of claim 7, further comprising instructions that, when executed in the computing device, perform the steps of:
   modifying the virtualized application package to synchronize application state of the application installed on the computer system.

9. The non-transitory computer-readable storage medium of claim 7, further comprising instructions that, when executed in the computing device, perform the steps of:
   receiving one or more changes to at least one application resource of the virtualized application package.

10. The non-transitory computer-readable storage medium of claim 7, further comprising instructions that, when executed in the computing device, perform the steps of:
    responsive to receiving a request to failover to the virtualized application package, determining an application state for the virtualized application package; and
    retrieving one or more versioned changes to at least one application resource of the virtualized application package to generate the determined application state.

11. The non-transitory computer-readable storage medium of claim 7, further comprising instructions that, when executed in the computing device, perform the steps of:
    determining file permissions for the application resources associated with the application according to a state of the virtualized computer system prior to the uninstalling.

12. The non-transitory computer-readable storage medium of claim 7, further comprising instructions that, when executed in the computing device, perform the steps of:
    monitoring execution of the copy of the application on the virtualized computer system to determine additional application resources associated with the application.

13. A computer system for backing up an application installed on a target computer system, the computer system comprising a system memory and a processor programmed to carry out the steps of:
    virtualizing the target computer system to generate a virtualized computer system having a copy of the application installed thereon;
    uninstalling the copy of the application from the virtualized computer system;
    determining locations of application resources associated with the application based on a comparison of states of the virtualized computer system prior to the uninstalling and after the uninstalling;
    generating a virtualized application package for the application based on the determined locations of the application resources associated with the application; and
    generating a library of application states for the application, wherein the library of application states comprises a plurality of versioned changes to at least one application resource of the virtualized application package.

14. The computer system of claim 13, wherein the processor is further programmed to carry out the step of:
    modifying the virtualized application package to synchronize application state of the application installed on the computer system.

15. The computer system of claim 13, wherein the processor is further programmed to carry out the step of:
    receiving one or more changes to at least one application resource of the virtualized application package.

16. The computer system of claim 13, wherein the processor is further programmed to carry out the step of:
    responsive to receiving a request to failover to the virtualized application package, determining an application state for the virtualized application package; and retrieving one or more versioned changes to at least one application resource of the virtualized application package to generate the determined application state.

17. The computer system of claim 13, wherein the processor is further programmed to carry out the step of:
   determining file permissions for the application resources associated with the application according to a state of the virtualized computer system prior to the uninstalling.

18. The computer system of claim 13, wherein the processor is further programmed to carry out the step of:
   monitoring execution of the copy of the application on the virtualized computer system to determine additional application resources associated with the application.

\* \* \* \* \*